(12) United States Patent
Lin

(10) Patent No.: US 8,662,677 B2
(45) Date of Patent: Mar. 4, 2014

(54) PROJECTION APPARATUS, ILLUMINATION MODULE AND BRIGHTNESS ADJUSTING METHOD FOR THE PROJECTION APPARATUS

(75) Inventor: Chia-Jui Lin, Taoyuan-Hsien (TW)

(73) Assignee: Delta Electronics, Inc. (TW)

( * ) Notice: Subject to any disclaimer, the term of this patent is extended or adjusted under 35 U.S.C. 154(b) by 257 days.

(21) Appl. No.: 13/204,800

(22) Filed: Aug. 8, 2011

(65) Prior Publication Data

US 2012/0127439 A1    May 24, 2012

(30) Foreign Application Priority Data

Nov. 22, 2010  (TW) ................................ 99140161 A

(51) Int. Cl.
  *G03B 21/14*    (2006.01)
  *G03B 21/20*    (2006.01)
  *F21V 19/02*    (2006.01)

(52) U.S. Cl.
  USPC ............... 353/87; 353/82; 353/119; 362/285; 362/271; 362/284

(58) Field of Classification Search
  USPC .............. 353/82, 87, 119; 362/285, 286, 271, 362/284
  See application file for complete search history.

(56) References Cited

U.S. PATENT DOCUMENTS

| 7,377,651 B2 * | 5/2008 | Belliveau ..................... 353/30 |
| 2007/0097338 A1 | 5/2007 | Lin |
| 2011/0102745 A1 * | 5/2011 | Cheng et al. .................... 353/10 |

FOREIGN PATENT DOCUMENTS

| CN | 1758090 A | 4/2006 |
| CN | 1900815 A | 1/2007 |
| CN | 101424868 A | 5/2009 |

OTHER PUBLICATIONS

CN Office Action for Application Serial No. 201010601803.4; Date of Mailing: May 10, 2013; 20 pgs. with English Translation.

* cited by examiner

*Primary Examiner* — Tony Ko
*Assistant Examiner* — Madga Cruz
(74) *Attorney, Agent, or Firm* — Cantor Colburn LLP

(57) ABSTRACT

A projection apparatus, an illumination module and a brightness adjusting method for the projection apparatus are provided. The projection apparatus comprises the illumination module and the actuator. The illumination module comprises a luminous element. First, the actuator drives the luminous element to move from the first position to the second position to detect the first brightness and second brightness generated by the luminous element. When the first brightness is higher than the second brightness, the actuator is adapted to drive the luminous element to the first position. Thereby, the brightness of a projection image generated by the projection apparatus can be adjusted to an optimal value.

23 Claims, 3 Drawing Sheets

PROJECTION APPARATUS, ILLUMINATION MODULE AND BRIGHTNESS ADJUSTING METHOD FOR THE PROJECTION APPARATUS

This application claims the benefits of the priority based on Taiwan Patent Application No. 099140161 filed on Nov. 22, 2010, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a projection apparatus, and more particularly, to an illumination module for adjusting a position of a luminous element of a projection apparatus and a method for adjusting the brightness of a projection frame of the projection apparatus.

2. Descriptions of the Related Art

Nowadays, projection apparatuses have found a wide application in various business conferences, home theaters and the like. As shown in FIG. 1, there is an illumination module 2 of a conventional projection apparatus 1. The illumination module 2 has a light source 21, an integration rod 22, a plurality of optical elements 23 and a digital micromirror device (DMD) 24. A light ray is emitted from the light source 21, homogenized by the integration rod 22 into an almost parallel light, then refracted by the optical elements 23 into the digital micromirror device 24 to be combined with an image input signal, and finally reflected from the digital micromirror device 24 to form a projection frame of the projection apparatus 1.

However, during the actual assembly process of the illumination module 2 of the conventional projection apparatus 1, it is often impossible for the light source 21, the integration rod 22, the optical elements 23 and the digital micromirror device 24 to be aligned exactly, resulting in an offset of the position of the light source 21. This makes it impossible for the light source 21 to project all the light rays to the integration rod 22 at a preferred position, thereby affecting the brightness of the projection frame thereof.

To solve the aforesaid problem, after the conventional projection apparatus 1 is assembled, a plurality of brightness sensors are usually provided around a projection screen to detect the brightness of the projection frame projected by the projection apparatus 1, and the light source 21 is manually adjusted to an optimal position so that all the light rays of the light source 21 are emitted to the integration rod 22. However, this kind of manual calibration is not only time- and labor-consuming but also fails to achieve a completely accurate alignment. Moreover, if an offset of positions of such elements as the light source 21 and the integration rod 22 takes place after some internal part of the projection apparatus 1 is replaced by a user, then the user who has no professional equipment, such as a brightness sensor, will be unable to instantly adjust the positions, leading to a significantly decreased imaging quality of the projection apparatus 1.

In view of this, an urgent need exists in the art to develop a technology for automatically adjusting a position of a light source to effectively adjust the brightness of a projection frame of a projection apparatus and to overcome shortcomings of complexity in the adjusting procedure and difficulty in the process control.

SUMMARY OF THE INVENTION

To solve the aforesaid problem, an objective of the present invention is to provide a projection apparatus and an illumination module thereof. The illumination module automatically adjusts a position of a luminous element thereof so that a light beam emitted by a light source is reflected by an optical element at the most proper and effective position to form an image.

To accomplish the aforesaid objective, the projection apparatus of the present invention comprises at least one optical element and an illumination module. The illumination module comprises a supporting frame, a luminous element and at least one actuator. The luminous element is disposed on the supporting frame to generate a light ray. The at least one actuator is connected to the luminous element to adjust a position of the luminous element with respect to the supporting frame so that when the luminous element is positioned at a position, the light ray is totally projected to the at least one optical element.

Another objective of the present invention is to provide a brightness adjusting method for the aforesaid projection apparatus. The projection apparatus comprises an illumination module and at least one actuator. The illumination module comprises a luminous element. The method comprises the following steps: (a) driving the luminous element to move between a first position and a second position by the at least one actuator; (b) detecting a first brightness and a second brightness presented by the light ray generated from the luminous element at the first position and the second position, respectively; (c) determining that the first brightness is stronger than the second brightness; and (d) adjusting the luminous element to the first position. Thereby, the brightness of a projection frame of the projection apparatus is automatically adjusted to an optimal value.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
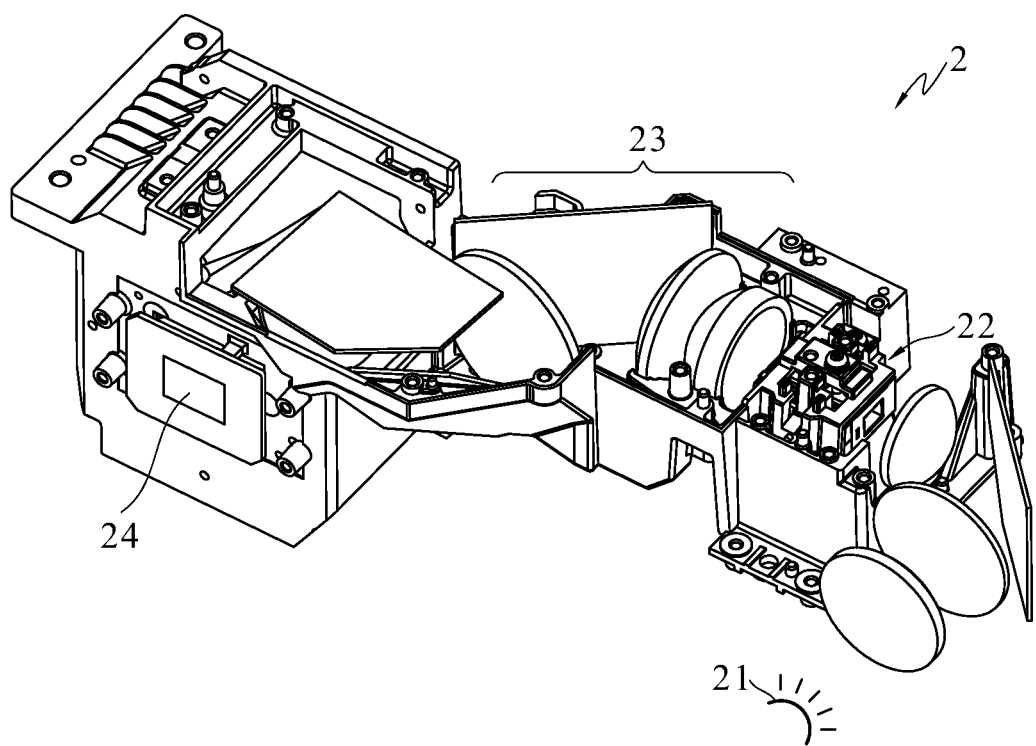
FIG. 1 is a partial structure diagram of an illumination module of a conventional projection apparatus.
Figure 2A:
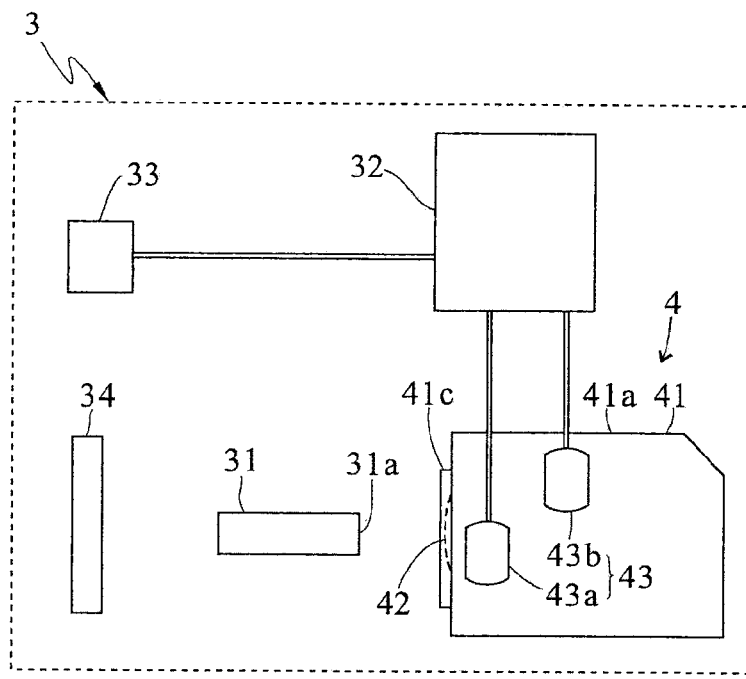
FIG. 2A is a schematic view of a projection apparatus of the present invention.
Figure 2B:
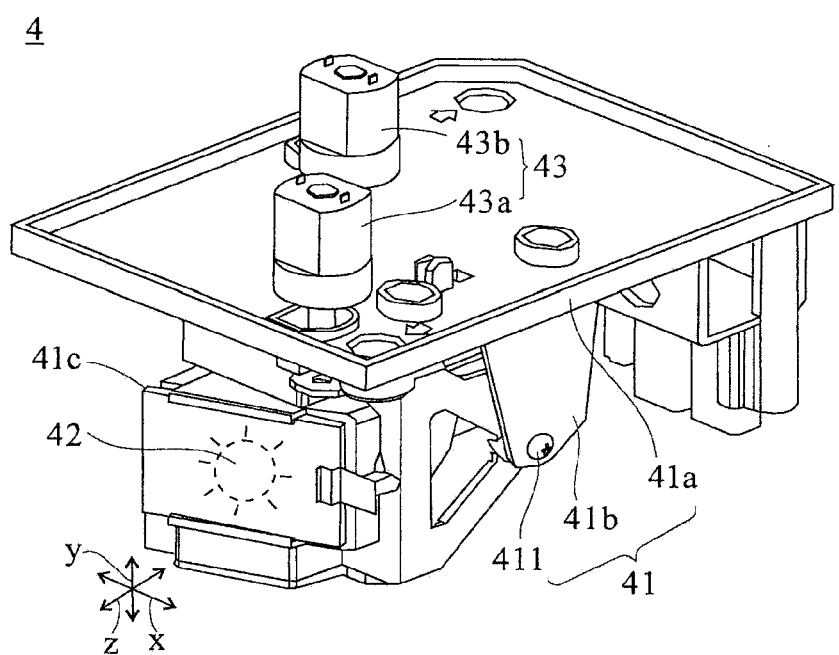
FIG. 2B is a structure diagram of an illumination module of the present invention.

In an embodiment of the present invention, a projection apparatus 3 comprises at least one optical element, a digital micromirror device (DMD) 34 and an illumination module 4. FIG. 2A is a schematic view of the projection apparatus 3 of the present invention, while FIG. 2B is a detailed structure diagram of the illumination module 4 of the projection apparatus 3 of the present invention. It shall be appreciated that to clearly illustrate the relative positions of the individual elements of the projection apparatus 3 of the present invention, other elements unrelated to the spirit of the present invention are omitted from depiction in both FIGS. 2A and 2B. The shapes of and dimensional relationships among the individual elements in the attached drawings are illustrated only for ease of understanding but not to limit the actual structure and scale.

Expanding on the above, the at least one optical element comprises an integration rod 31 having a light incident surface 31a, while the illumination module 4 comprises a supporting frame 41, a luminous element 42 and at least one actuator 43. The luminous element 42 is disposed on the supporting frame 41 and is adapted to generate a light ray. The at least one actuator 43 is connected to the luminous element 42 to adjust a position of the luminous element 42 with respect to the supporting frame 41 so that the light ray from the luminous element 42 is totally focused onto the light incident surface 31a. The light ray then passes through the integration rod 31 to be further projected to the digital micromirror device 34, which reflects the light ray of the luminous element 42 to form a projection frame with sufficient brightness.

More specifically, as shown in FIG. 2A and FIG. 2B, in this embodiment, the projection apparatus 3 further comprises a control module 32 and a brightness sensor 33. The at least one actuator 43 comprises a first motor 43a and a second motor 43b. The supporting frame 41 comprises a base 41a, an extending brace 41b connected to the base 41a and a receiving portion 41c pivoted on the extending brace 41b. The luminous element 42 is disposed in the receiving portion 41c. Accordingly, when electrically connected with the at least one actuator 43, the control module 32 is adapted to drive the first motor 43a and the second motor 43b so that the second motor 43b drives the extending brace 41b to move along a first direction x with respect to the base 41a, while the first motor 43a drives the receiving portion 41c to rotate on a second direction y with respect to the extending brace 41b. In other words, the second motor 43b adjusts the luminous element 42 to move in the first direction x, while the first motor 43a adjusts the luminous element 42 to rotate on the second direction y so that the luminous element 42 moves from a first position to a second position, wherein the first direction x and the second direction y are perpendicular to each other.

In detail, with reference to FIG. 2B, when the first motor 43a drives the receiving portion 41c, the receiving portion 41c, with at least one fastener 411 of the extending brace 41b as a pivot, rotates up and down in the second direction y with respect to the extending brace 41b. The base 41a and the extending brace 41b are joined with each other via a guide groove or a rack (not shown). Thereby, the second motor 43b can drive the extending brace 41b to move to the left or to the right in the guide groove or the rack; i.e., the second motor 43b moves to the left or to the right along the first direction x with respect to the base 41a by means of the guide groove or the rack. However, the illumination module 4 of the present invention is not limited to the aforesaid way in which it operates; and people skilled in the art may readily infer that preferably in other embodiments of the present invention, the receiving portion 41c can be controlled to move back and forth in a third direction z directly by the first motor 43a, the second motor 43b or a third motor that is further disposed, which can increase the flexibility of adjusting the position of the luminous element 42. It shall be appreciated that the first direction x, the second direction y and the third direction z are perpendicular to each other. The method in which the base 41a and the extending brace 41b are joined with each other via the guide groove or the rack in the present invention can be readily understood by people skilled in the art, and thus is omitted from depiction and description in the present invention.

When the control module 32 drives the at least one actuator 43 to move the luminous element 42 from the first position to the second position in the first direction x and the second direction y, the digital micromirror device 34 reflects the light ray that is received when the luminous element 42 is at the first position and the second position respectively to the brightness sensor 33. Then, the brightness sensor 33 detects a first brightness and a second brightness presented by the light ray generated from the luminous element 42 at the first position and the second position respectively, and transmits a first brightness signal and a second brightness signal to the control module 32. The control module 32 compares the first brightness signal with the second brightness signal. If it is determined that the first brightness signal is stronger than the second brightness signal, it means that the luminous element 42 at the first position can more fully project the light ray thereof to the integration rod 31 to be focused on the light incident surface 31a. Therefore, the control module 32 drives the at least one actuator 43 to move the luminous element 42 from the second position to the first position regarding the first direction x and the second direction y.

Through the aforesaid operations, the control module 32 is adapted to further drive the at least one actuator 43 to move the luminous element 42 from the first position to a third position. Then, the brightness sensor 33 detects a third brightness and transmits a third brightness signal to the control module 32. When determining that the third brightness signal is weaker than the first brightness signal, the control module 32 drives the at least one actuator 43 to move the luminous element 42 from the third position back to the first position. In this way, the position of the luminous element 42 is adjusted repeatedly, and if the control module determines that the strongest brightness signal can be read when the luminous element 42 is at the first position, then the luminous element 42 is positioned at the first position. At this point, the luminous element 42 completely projects the light ray thereof into the integration rod 31 at an optimal position so that when the light ray is reflected by the digital micromirror device 34 to form a projection frame of the projection apparatus 3, the projection frame can be presented with sufficient brightness.

In other embodiments of the present invention, the brightness sensor 33 is disposed on a projection screen. When the light ray of the luminous element 42 is reflected by the digital micromirror device 34 to form a projection frame on the projection apparatus 3 and is projected onto the projection screen, the brightness sensor 33 senses part of the light ray that is reflected by the digital micromirror device 34 to detect the first brightness and the second brightness corresponding to the first position and the second position of the luminous element 42 respectively, and transmits the first brightness signal and the second brightness signal to the control module 32.

Furthermore, in other embodiments of the present invention, the illumination module 4 may also have a plurality of luminous elements 42 and a plurality of supporting frames 41. Each of the luminous elements 42 is adapted to generate a light ray and is disposed on one of the supporting frames 41. The at least one actuator 43 is electrically connected to the luminous elements 42 and the control module 32 to adjust a position of each of the luminous elements 42 with respect to the corresponding supporting frame 41. Thereby, the brightness sensor 33 transmits a brightness signal of each of the luminous elements 42 to the control module 32 to drive the at least one actuator 43 to adjust a position of the luminous element 42 so that the light ray is reflected by the digital micromirror device 34 to form a projection frame with sufficient brightness.

Figure 3A:
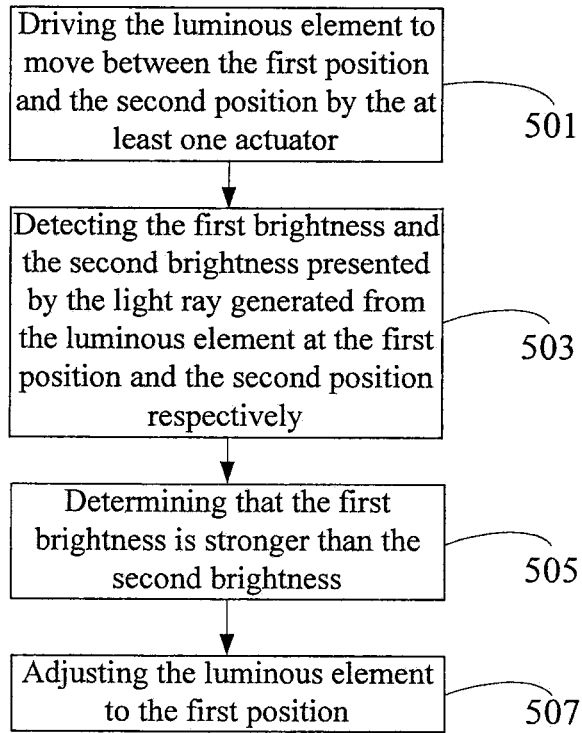
FIG. 3A is a flowchart of a brightness adjusting method for the projection apparatus according to the present invention.

The present invention also provides a brightness adjusting method for adjusting the brightness of the projection frame of the aforesaid projection apparatus 3 (as shown in FIG. 2A and FIG. 2B). As described above, the projection apparatus 3 comprises the brightness sensor 33, the illumination module 4 and the at least one actuator 43. The illumination module 4 comprises the luminous element 42 for generating the light ray. As shown in FIG. 3A, there is a flowchart of the brightness adjusting method, which comprises the following steps: firstly, in a step 501, driving the luminous element 42 to move between the first position and the second position by the at least one actuator 43; then, in a step 503, detecting the first brightness and the second brightness presented by the light ray generated from the luminous element 42 at the first position and the second position respectively; in a step 505, determining that the first brightness is stronger than the second brightness; and finally, in a step 507, adjusting the luminous element 42 to the first position. Therefore, compared to being at the second position, the luminous element 42, when being at the first position, can totally project the light ray thereof, which then passes through the at least one optical element of the projection apparatus 3 and is further reflected to form the projection frame with sufficient brightness.

Figure 3B:
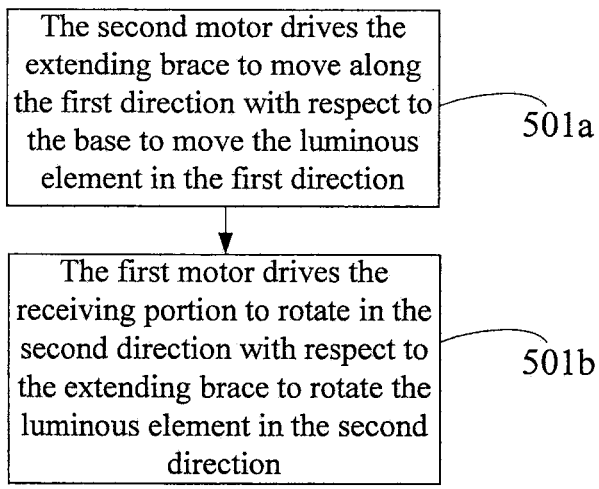
FIG. 3B is a flowchart showing detailed sub-steps of step 501 in FIG. 3A.

In detail, as in the aforesaid projection apparatus 3, the at least one actuator 43 comprises the first motor 43a and the second motor 43b; the illumination module 4 comprises the supporting frame 41; the supporting frame 41 comprises the base 41a, the extending brace 41b is connected to the base 41a via the guide groove or the rack, and the receiving portion 41c is pivoted on the extending brace 41b via the at least one fastener 411; and the luminous element 42 is disposed in the receiving portion 41c. The detailed sub-steps of the step 501 is shown in FIG. 3B. First, in a sub-step 501a, the second motor 43b drives the extending brace 41b to move in the guide groove or the rack (i.e., drives the extending brace 41b to move along the first direction x with respect to the base 41a) to move the luminous element 42 in the first direction x. Then, in a sub-step 501b, the first motor 43a drives the receiving portion 41c so that with the at least one fastener 411 as a pivot, the receiving portion 41c rotates in the second direction y with respect to the extending brace 41b to rotate the luminous element 42 on the second direction y, wherein the first direction x and the second direction y are perpendicular to each other. Thereby, the at least one actuator 43 drives the luminous element 42 to move between the first position and the second position by controlling the extending brace 41b and the receiving portion 41c. It shall be appreciated that in other embodiments of the present invention, in order to increase the flexibility of adjusting the position of the luminous element 42, the projection apparatus 3 may additionally have a third motor, and the brightness adjusting method of the present invention may additionally have a sub-step 501c in which the third motor controls the receiving portion 41c to move in a third direction z. The first direction x, the second direction y and the third direction z are perpendicular to each other. This can be readily inferred by people skilled in the art and thus will not be further described herein.

In the step 503, the light rays projected to the brightness sensor 33 by the luminous element 42 at the first position and the second position respectively are received by the brightness sensor 33 of the projection apparatus 3. In this embodiment, the projection apparatus 3 further comprises the digital micromirror device 34, so a step 502 may further be added prior to the step 503; this step is to partially reflect the light rays generated by the luminous element 42 at the first position and the second position respectively to the brightness sensor 33 by using the digital micromirror device 34.

In the step 505, the control module 32 of the projection apparatus 3 compares the first brightness signal with the second brightness signal transmitted by the brightness sensor 33 according to the first brightness and the second brightness. If it is determined that the first brightness signal is stronger than the second brightness signal, then in the step 507, the control module 32 sends a control signal to the at least one actuator 43 which, according to the control signal, drives the luminous element 42 to the first position.

According to the above descriptions, as compared to the conventional projection apparatus which has a manually adjusted a position of an internal luminous element, the illumination module for the projection apparatus and the brightness adjusting method thereof of the present invention can have an automatically adjusted the position of the luminous element with the help of the control module, the actuator and the brightness sensor. Thereby, the light ray of the luminous element can effectively pass through the optical elements and is projected to form the projection frame with a sufficient brightness, thus, improving the imaging quality of the projection apparatus and also eliminating the unnecessary adjustment procedure to reduce the manufacturing cost of the projection apparatus.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An illumination module for use in a projection apparatus, the projection apparatus further comprising at least one optical element, the illumination module comprising:
    a supporting frame;
    a luminous element disposed on the supporting frame to generate a light ray; and
    at least one actuator connected to the luminous element to adjust a position of the luminous element with respect to the supporting frame so as to project the light ray to the at least one optical element, wherein the at least one actuator comprises a first motor and a second motor, the second motor adjusts the luminous element to move along a first direction, and the first motor adjusts the luminous element to rotate on a second direction.

2. The illumination module as claimed in claim 1, wherein the supporting frame comprises a base, an extending brace connected to the base, and a receiving portion pivoted on the extending brace, and the luminous element is disposed in the receiving portion.

3. The illumination module as claimed in claim 2, wherein the second motor drives the extending brace to move along the first direction with respect to the base, and the first motor drives the receiving portion to rotate on the second direction with respect to the extending brace.

4. The illumination module as claimed in claim 1, wherein the at least one optical element comprises an integration rod.

5. The illumination module as claimed in claim 4, wherein the integration rod has a light incident surface, and the light ray is focused on the light incident surface.

6. A projection apparatus, comprising:
at least one optical element; and
an illumination module comprising:
a supporting frame; and
a luminous element disposed on the supporting frame to generate a light ray; and
at least one actuator connected to the luminous element to adjust a position of the luminous element with respect to the supporting frame so as to project the light ray to the at least one optical element, wherein the at least one actuator comprises a first motor and a second motor, the second motor adjusts the luminous element to move along a first direction, and the first motor adjusts the luminous element to rotate on a second direction.

7. The projection apparatus as claimed in claim 6, further comprising a control module electrically connecting with the at least one actuator, wherein the control module is adapted to drive the at least one actuator to adjust the luminous element to move from a first position to a second position regarding the first direction and the second direction.

8. The projection apparatus as claimed in claim 7, wherein the supporting frame comprises a base, an extending brace connected to the base, and a receiving portion pivoted on the extending brace, and the luminous element is disposed in the receiving portion.

9. The projection apparatus as claimed in claim 8, wherein the second motor drives the extending brace to move along the first direction with respect to the base, and the first motor drives the receiving portion to rotate on the second direction with respect to the extending brace.

10. The projection apparatus as claimed in claim 7, further comprising a digital micromirror device (DMD) to receive and reflect the light ray.

11. The projection apparatus as claimed in claim 10, wherein the at least one optical element comprises an integration rod for the light beam to pass therethrough to be projected onto the digital micromirror device.

12. The projection apparatus as claimed in claim 11, wherein the integration rod has a light incident surface for the light beam to be focused thereon.

13. The projection apparatus as claimed in claim 11, further comprising a brightness sensor to detect a first brightness and a second brightness presented by the light ray generated from the luminous element at the first position and the second position, respectively.

14. The projection apparatus as claimed in claim 13, wherein the brightness sensor is disposed in the projection apparatus, and the digital micromirror device operatively reflects the light ray to the brightness sensor to detect the first brightness and the second brightness.

15. The projection apparatus as claimed in claim 13, wherein the brightness sensor is disposed on a projection screen, and the digital micromirror device operatively reflects the light ray to the brightness sensor to detect the first brightness and the second brightness.

16. A brightness adjusting method for use in a projection apparatus, the projection apparatus comprising an illumination module and at least one actuator, the illumination module having a luminous element for generating a light ray, the method comprising the following steps of:
(a) driving the luminous element to move between a first position and a second position by the at least one actuator;
(b) detecting a first brightness and a second brightness presented by the light ray generated from the luminous element at the first position and the second position, respectively;
(c) determining that the first brightness is stronger than the second brightness; and
(d) adjusting the luminous element to the first position.

17. The method as claimed in claim 16, wherein the at least one actuator comprises a first motor and a second motor, and the step (a) comprises steps of:
(a1) adjusting the luminous element to move along a first direction by the second motor; and
(a2) adjusting the luminous element to rotate on a second direction by the first motor.

18. The method as claimed in claim 17, wherein the projection apparatus further comprises a brightness sensor, and the step (b) is to use the brightness sensor to receive the light ray generated from the luminous element at the first position and the second position and projected to the brightness sensor.

19. The method as claimed in claim 18, wherein the projection apparatus further comprises a digital micromirror device (DMD), and the method further comprises a step before the step (b): reflecting the light ray to the brightness sensor by using the digital micromirror device.

20. The method as claimed in claim 18, wherein the projection apparatus further comprises a control module, and the step (c) is to use the control module to compare a first brightness signal with a second brightness signal delivered by the brightness sensor according to the first brightness and the second brightness.

21. The method as claimed in claim 17, wherein the illumination module further comprises a supporting frame having a base, an extending brace connected to the base, and a receiving portion pivoted on the extending brace, and the luminous element is disposed in the receiving portion, and the step (a1) is to drive the extending brace to move along the first direction with respect to the base.

22. The method as claimed in claim 21, wherein the step (a2) is to drive the receiving portion to rotate on the second direction with respect to the extending brace.

23. The method as claimed in claim 16, wherein the step (d) is to use the control module to transmit a control signal to the at least one actuator such that the at least one actuator drives the luminous element to the first position according to the control signal.

* * * * *